Oct. 31, 1950

M. A. GILMAN 2,528,272

MIXING FAUCET

Filed June 17, 1946

INVENTOR.
MORRIS GILMAN
BY
Harry H. Hitzeman
ATTORNEY

Oct. 31, 1950 M. A. GILMAN 2,528,272
MIXING FAUCET
Filed June 17, 1946 2 Sheets-Sheet 2
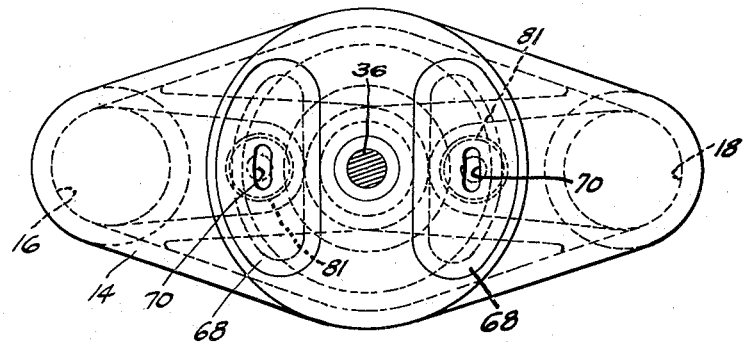
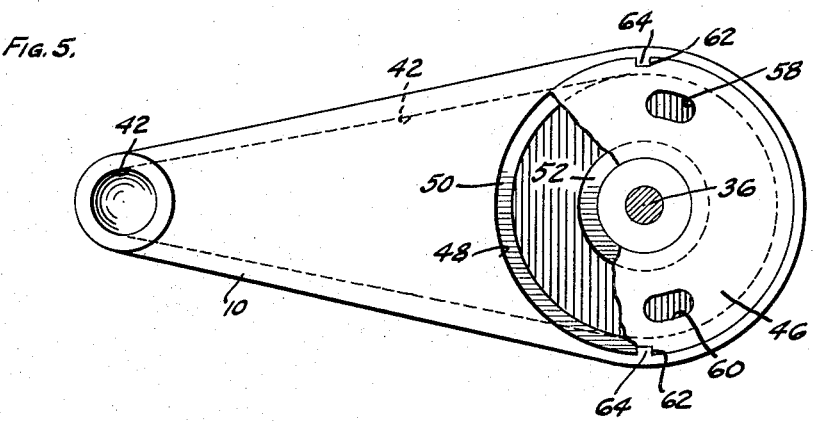
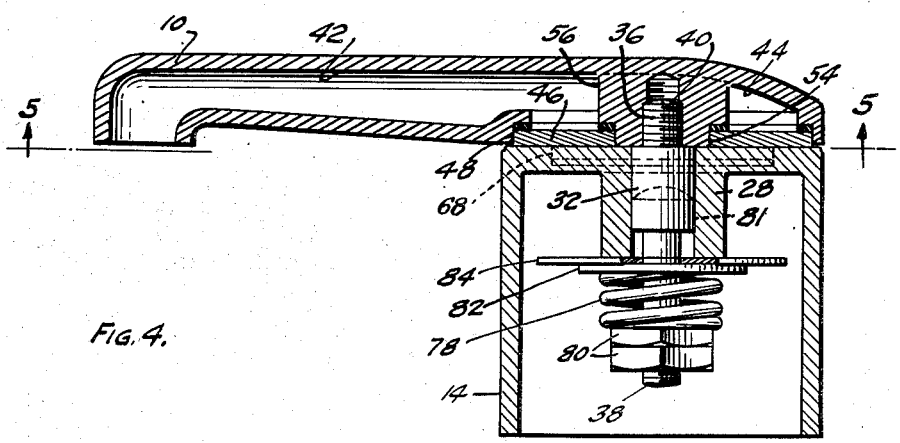
INVENTOR.
MORRIS GILMAN
BY Harry H. Hitzeman
ATTORNEY.

Patented Oct. 31, 1950

2,528,272

UNITED STATES PATENT OFFICE 2,528,272

MIXING FAUCET

Morris A. Gilman, Chicago, Ill., assignor to Gilhoff Corporation, Chicago, Ill., a corporation of Illinois Application June 17, 1946, Serial No. 677,191

9 Claims. (Cl. 251—88)

1

My invention relates to improvements in valve construction for fluid conduits.

My invention will be described with particular reference to improvements in valve construction for water faucets having a single spout which is associated with a hot and cold water supply line and having a mixing chamber therein so that combined hot and cold water in desired proportions can be furnished through the single spout. It will be understood, however, that valves of this particular type have a wide and varied use in the control of liquids, fluids or gases, and the present embodiment will be for the purpose of describing a particular adaptation thereof.

A great many water faucets have been devised in the past having mixing chambers therein and hot and cold water connections thereto. Most of these, however, have tapered valve plugs adapted to work in a tapered bore under spring pressure. They usually require packing glands or other sealing means to keep the valve seated under abnormal pressures.

The principal object of the present invention is to provide an improved water faucet for hot and cold water having a single spout and a mixing chamber therein so that with a source of hot and cold water to the single spout, by turning the same, water of any desired temperature is obtained.

A further object of the invention is to provide in a water faucet of the type described, flat or plate valves yieldingly held in contact and actuated to permit flow of water by rotating the spout.

A further object of the invention is to provide spring means normally holding said plate valves in frictional face contact and automatically operated counterbalancing means for increasing the spring pressure holding said plate valves in contact whenever any unusual surge of pressure appears in the water supply lines.

A further object of the invention is to provide an improved water faucet having a single spout and improved valve means cooperating with the spout for opening or closing valves leading to the spout in accordance with the arcuate position to which the end of the pivot is swung.

A further object of the invention is to provide a water faucet construction wherein the valve members which normally wear and must be replaced consist of a disc and a pair of arcuately shaped plate members easily removable and replaceable. This construction also eliminates the need for packing glands or similar sealing means to prevent leakage.

2

A further object of the invention is to provide an improved water faucet that is comparatively simple in construction and one that will not leak even under abnormal pressures, will not easily become broken and cannot become out of order.

Other objects and advantages will be more apparent from the following description wherein reference is had to the accompanying two sheets of drawings, upon which:

Fig. 3 is a plan sectional view taken on the line 3—3 of Fig. 2;

Fig. 4 is a cross-sectional view taken on the line 4—4 of Fig. 1;

Fig. 5 is a plan sectional view looking upwardly and is taken on the line 5—5 of Fig. 4

Figure 1:
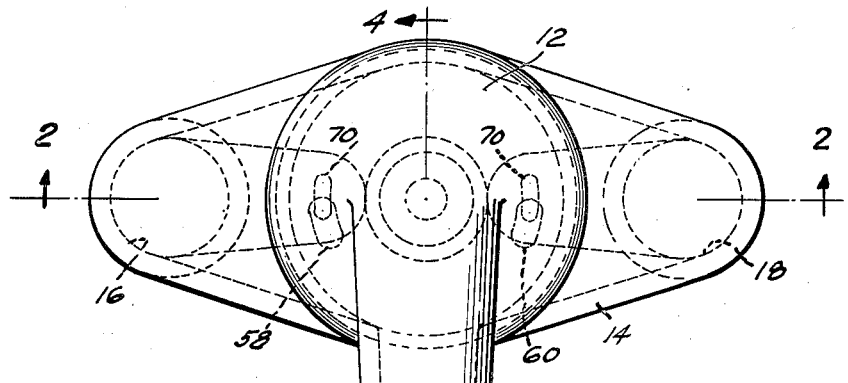
Fig. 1 is a plan view of a water faucet constructed in accordance with my invention.
Figure 6:
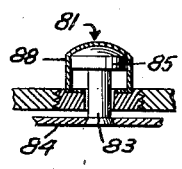
Fig. 6 is a fragmentary sectional view of one of the counter-balancing plug members, taken on the line 6—6 of Fig. 2.

In the embodiment which I have chosen to illustrate my invention, in Fig. 1 I have shown a spout 10 which is formed integrally with a spout cap 12 that is fastened to the top of a housing 14. The housing 14 may be provided with a pair of inlet passageways 16 and 18 that have pipe threads 20 adjacent their lower end to receive the hot and cold water pipes 22 and 24. The passageway 16 communicates with a horizontal chamber 17 in the upper end of the housing 14 and the passageway 18 communicates with a similar chamber 19 in the upper end of the housing 14. The boss 28 has a bore 30 to receive the cylindrical shoulder 32 of a pivot member 34 that is provided with a screw-threaded portion 36 at its upper end and a screw-threaded portion 38 at its lower end.

Figure 2:
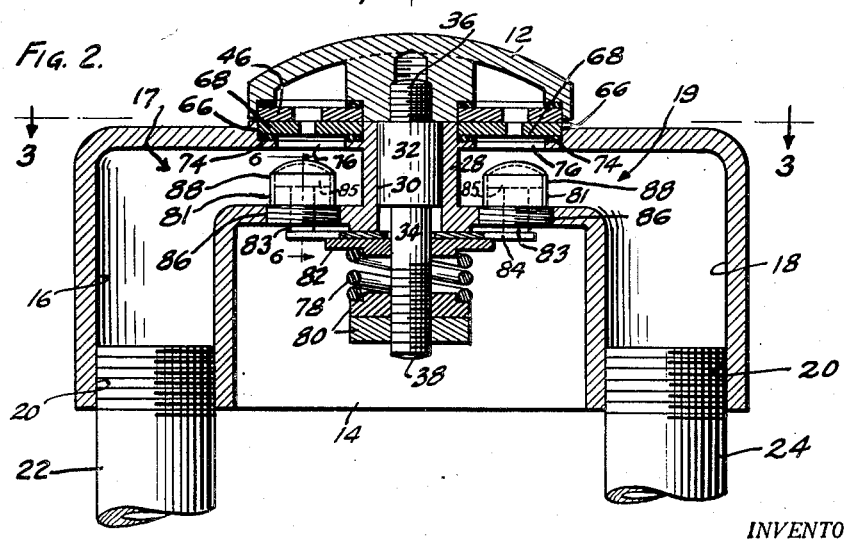
Fig. 2 is a cross-sectional view of the same taken on the line 2—2 of Fig. 1.

The spout cap, as most clearly shown in Figs. 2 and 4, may be provided with a tapped medial opening 40 to receive the shank 36 of the pivot 34. A passageway 42 may run from the end of the spout to a generally circular chamber 44 in the spout cap.

I provide a flat disc valve 46 in the spout cap 12, the same being mounted in a cylindrical bore 48 and positioned against a pair of concentric rubber gaskets 50 and 52 mounted in the bore 48 and about the reduced shoulder 54 of a central post 56 in the spout cap. The valve 46 is provided with two valve ports 58 and 60 and a pair of notches 62 that cooperate with the shoulders 64 to assure that the valve plate turns whenever the spout is rotated about the pivot 34.

The housing 14 may be provided with a pair of generally arcuately shaped pockets 66 to receive a pair of plate members 68. The plate members 68 are both provided with an arcuately shaped port 70 which is so located that as the spout 10 is rotated the ports 58 and 60 will become aligned with the ports 70 so that water may flow through the same. Thus, in the position shown in Fig. 1, an equal amount of both hot and cold water will flow through the ports in the valves and out through the passage 42 in the spout 10. When the spout is swung to the right in Fig. 1, a larger amount of cold water will be permitted to flow through and a smaller amount of hot water. Conversely, when the spout is swung to the left in Fig. 1, the supply of cold water will be diminished and the supply of hot water will be increased. Thus by swinging the spout either to the right or left, all hot or all cold water will be supplied when desired. It will further be apparent that when the spout is swung either entirely to the right or to the left, both supplies of water will be shut off, which is the normal condition that the spout will be in when the water faucet is not in use.

The disc valve 46 and the valve plates 68 may be provided with raised faces so that a nearly perfect seal is obtained between the same, and it is well known that a face-to-face seal of this type is the most effective in withstanding pressures and preventing leakage at the seal. The plates 68 (see Fig. 2) are also mounted upon compressible gaskets 74 of a suitable contour to fit in the recesses 66 around the openings 76 in the chambers 17 and 19 respectively.

Means for yieldingly holding the lapped faces of the valve plates together are provided and may comprise the compression spring 78 positioned between suitable lock nuts 80 mounted on the pivot 34 and a washer 82 adjacent the lower end of the boss 28.

While the above construction has been found highly efficient and capable of withstanding leakage at the valve ports, I have found that there are frequent surges of water in city mains where the faucet valves are subjected to unusually high pressures. Accordingly I have provided means for counteracting these pressures to provide stronger spring holding means at these times than is normally necessary.

These means may be in the nature of automatically operating counterbalances, which include plug members 81, one of which is mounted in each of the chambers 17 and 19. Each plug member may include a center stem 83 having a head 85, the stem being fastened at its end in a disc 84 that is positioned between the washer 82 and the end of the boss 28. Each of the plug members 81 may include a screw-threaded portion 86 mounted in a suitable tapped opening in the bottom wall of each of the chambers 17 and 18 and a flexible cap 88 of neoprene or similar material is adapted to telescopically receive the plunger head 85 of the stem 83 and to effectively seal the plug from the liquid in the chambers. The operation of these counterbalancing plugs is as follows: If there is a sudden surge of pressure in the cold water line, the pressure will act upon the plug 81 and force the plunger head 85 of the stem 83 downwardly, thus through the disc 84 tending to compress the spring 78 to a greater degree to more effectively hold the faces of the valve plates together. If a surge of higher pressure occurs in the hot water line, the action upon the plug assembly in the chamber 17 will be the same and there will be a further downward pressure upon the compression spring 78 to compress it still further.

In the event that the valve plates wear out, it is a comparatively simple matter to remove the spout, whereupon both the disc valve in the face of the spout and the plate valves in the top of the housing are accessible for easy removal and replacement.

While I have illustrated and described a specific embodiment of my invention, it will be apparent to those skilled in the art that changes and modifications can be made in the exact details shown, and I do not wish to be limited in any particular, rather what I desire to secure and protect by Letters Patent of the United States is:

1. A water faucet comprising a housing having a hot and cold water conduit connected thereto, each of said conduits communicating with a separate chamber, a pivot post disposed between said chambers, a removable plate valve seat on each side of said post, a port in each of said valve seats, a spout having a cap mounted upon said central post, a removable disc valve in said cap and ports in said disc valve adapted when said spout is rotated to be aligned with the ports in said plate valve seats or one or the other of the same, said disc valve operatively connected to said pivot post.

2. A water faucet comprising a housing having a hot and cold water conduit connected thereto, each of said conduits communicating with a separate chamber, a pivot post disposed between said chambers, a removable plate valve seat on each side of said post, a port in each of said valve seats, a spout having a cap mounted upon said central post, a removable disc valve in said cap, ports in said disc valve adapted when said spout is rotated to be aligned with the ports in said plate valve seat or one or the other of the same, and spring means associated with said central post for yieldingly holding said plate valve seats and said disc valve in frictional face engagement, said spring means also having counterbalancing means associated therewith for causing greater spring tension whenever there is a surge of pressure in either the hot or cold water conduit, the surge of pressure actuating said counterbalancing means.

3. A water faucet comprising a housing having a hot water and a cold water chamber in said housing hot and cold water conduits communicating with said hot and cold water chambers respectively, a pivot post disposed in said housing between said chambers, a plate valve seat on each side of said post, an opening in each of said chambers closed by one of said valve seats, a port in each of said valve seats, a spout having a hollow cap mounted upon said central post, a disc valve in said cap and operatively connected thereto, said disc valve in face contact with said plate valve seats, ports in said disc valve adapted when said spout is rotated to be aligned with the ports in said plate valve seats or one or the other of the same, a compression spring positioned between a shoulder on said housing and adjusting nuts on said pivot post for yieldingly holding said disc valve and said plate valve seats in frictional engagement, and movable plugs one in each of said chambers for placing said spring under greater tension whenever there is a pressure surge in either the hot or cold water conduits, said plugs operatively connected to said spring upon opposite sides of said pivot post.

4. In a device of the class described, a valve casing having hot and cold water inlets, each of said inlets communicating with a separate chamber, a removably mounted plate valve seat at the top of each chamber, each valve seat having a port therein, a spout member secured on the top of said casing, said spout member having a removably mounted disc plate valve in face engagement with said plate valve seats, ports in said disc valve, said spout rotatable about a central post and adapted when rotated to a proper position to permit either cold or hot or a mixture of cold and hot water to be released through said spout.

5. In a device of the class described, a valve casing having hot and cold water inlets, each of said inlets communicating with a separate chamber, a removable plate valve seat at the top of each chamber, each plate valve seat having a port therein, a spout member secured on the top of said casing, said spout member having a removable disc plate valve in face engagement with said plate valve seats, ports in said disc plate valve, said spout rotatable about a central post and adapted when rotated to a proper position to permit either cold or hot or a mixture of cold and hot water to be released through said spout, and spring means yieldingly holding said disc valve and said plate valve seats in frictional face engagement.

6. In a device of the class described, a valve casing having hot and cold water inlets, each of said inlets comunicating with a separate chamber, a plate valve seat at the top of each chamber, each valve seat having a port therein, a spout member secured on the top of said casing, said spigot member having a disc plate valve in face engagement with said plate valve seats, ports in said disc plate valve, said spout rotatable about a central post and adapted when rotated to a proper position to permit either cold or hot or a mixture of cold and hot water to be released through said spout, spring means yieldingly holding said disc plate valve and plate valve seats in frictional face engagement, and plunger means in each of said chambers for increasing the pressure of said spring means whenever there is a pressure surge in either said hot or cold water inlets, said plunger means operatively engaging said spring means.

7. In a device of the class described, a valve casing having hot and cold water inlets, each of said inlets communicating with a separate chamber, a plate valve seat at the top of each chamber, each valve seat having a port therein, a spout member secured on the top of said casing, said spigot member having a disc plate valve in face engagement with said plate valve seats, ports in said plate valve disc, said spout rotatable about a central post and adapted when rotated to a proper positon to permit either cold or hot or a mixture of cold and hot water to be released through said spout, spring means yieldingly holding said disc and plate valve seats in frictional face engagement, and plunger means in each of said chambers for increasing the pressure of said spring means whenever there is a pressure surge in either said hot or cold water inlets, said plunger means including a movable piston and a stem engaging a washer against which said spring means is positioned.

8. The combination with a fluid conduit having valve means therein, said means comprising a valve having a pivot post, a plate valve rotatable with said post, a port in said plate valve, a stationary plate valve in facing engagement with said rotatable plate valve, a port in said stationary plate valve, said stationary plate valve adapted when said post is rotated to align the ports in both said rotatable plate valve and said stationary plate valve, and means associated with said post for holding said rotatable and said stationary plate valves in frictional face engagement, said means having cooperating means associated therewith for increasing the frictional face engagement between said plate valves in direct proportion to any surge of pressure in said line, said cooperating means located in said conduit ahead of said plate valves.

9. In a device of the class described, a valve casing having a plurality of inlets and an outlet, a pivot post mounted in said casing, a plate valve rotatable with said post, a port in said plate valve, a stationary plate valve in facing engagement with said rotatable plate valve, a port in said stationary plate valve, said stationary plate valve adapted when said post is rotated to align the ports in both said rotatable plate valve and said stationary plate valve, and means associated with said post for holding said rotatable and said stationary plate valves in frictional face engagement, said means having movable members in said inlets responsive to pressure to increase the frictional engagement between said valve plates.

MORRIS A. GILMAN.

REFERENCES CITED

The following references are of record in the file of this patent:

UNITED STATES PATENTS

| Number | Name | Date |
| --- | --- | --- |
| 1,355,915 | Scheetz | Oct. 19, 1920 |
| 1,507,973 | Mohn | Sept. 9, 1924 |
| 1,527,927 | Schroder | Feb. 24, 1925 |
| 1,564,856 | Karlson | Dec. 8, 1925 |
| 1,842,894 | Breegle | Jan. 26, 1932 |